United States Patent Office 3,296,172
Patented Jan. 3, 1967

3,296,172
PREPARING AQUEOUS POLYMER DISPERSIONS
IN PRESENCE OF POLAR LIQUIDS
Dennis Light Funck, Fairfax, Del., and Vernon Clare Wolff, Jr., Orange, Tex., assignors to E. I. du Pont de Nemours and Company, Wilmington, Del., a corporation of Delaware
No Drawing. Filed Dec. 16, 1963, Ser. No. 330,532
11 Claims. (Cl. 260—29.6)

This invention relates to dispersions, and more particularly, to aqueous dispersions of substantially hydrocarbon polymers.

Aqueous dispersions of hydrocarbon polymers may be produced by a variety of methods. One of the commonly employed procedures involves dissolving the hydrocarbon polymer in a suitable water-immiscible solvent, emulsifying the solution in water and thereafter stripping off the water-immiscible solvent to yield the aqueous polymer dispersion. If desired emulsifying or dispersing agents may be employed in the process to facilitate the formation of fine particle dispersions. In order to minimize foaming during the aforesaid polymer solvent stripping operation, particularly when the process is carried out at reduced pressures, it, also, may be desirable to add to the emulsion, either before or during the stripping operation, a liquid which forms an azeotrope with the polymer solvent, thus permitting removal of said solvent at a lower temperature than in the absence of the azeotrope-forming liquid. While it is possible to produce aqueous hydrocarbon polymer dispersions by such processes as described above, the dispersions so produced often are limited as to the minimum polymer particle size and as to the maximum solids content which may be obtained.

It is an object of the present invention to prepare aqueous polymer dispersions. It is a further object to prepare aqueous polymer dispersions from substantially hydrocarbon polymers. A still further object is to prepare substantially hydrocarbon polymer dispersions having a finer average particle size than heretofore available in the art. Another object is to form aqueous polymer dispersions by a process employing substantially water-immiscible organic solvents. Still another object is to provide an aqueous polymer dispersion-forming process employing substantially water-immiscible solvents which can be removed from the aqueous dispersion without excessive foaming. Other objects will become apparent hereinafter.

The objects of the present invention are achieved by means of a process comprising the steps of dissolving a substantially hydrocarbon polymer in a suitable substantially water-immiscible solvent to form a polymer solution, contacting said polymer solution with a member selected from the group consisting of ammonia and organic amines having a dissociation constant of at least $1 \times 10^{-8}$, intimately contacting by agitating, usually at elevated temperatures, said ammonia- or amine-treated polymer solution with water in the presence of a dispersing agent and a polar liquid, and thereafter removing said substantially water-immiscible solvent and said polar liquid. The substantially hydrocarbon polymers which are useful herein are alpha-olefinic polymers, preferably those comprised of alpha-olefinic repeat units containing 2 to 18 carbon atoms, which possess a carboxylic acid group, or a derivative thereof capable of being converted to a carboxylic acid group via hydrolysis during the process, attached to the main or backbone polymer chain, either directly through a single carbon-carbon linkage or through a series of carbon-carbon linkages. Such polymers may be prepared by a variety of techniques. For example, by means of conventional free radical polymerization techniques, an alpha-olefin such as ethylene may be copolymerized directly with a monomer which contains a carboxylic acid group or a derivative thereof so as to produce a substantially hydrocarbon polymer. As exemplitive of the wide variety of monomers which thus may be copolymerized with ethylene to provide the carboxyl functionality are the alkenoic acids, alkenedioic acids, alkene tricarboxylic acid, methylene alkanedioic acids, and acid derivatives of these monomers. Specific carboxylic acid group-containing monomers include acrylic acid, methacrylic acid, fumaric acid, maleic acid, itaconic acid, aconitic acid and the like. Acid derivatives of the aforesaid, such as esters, amides, anhydrides and the like, also, may be employed as monomers. While these derivatives must be convertible to a free carboxylic acid group prior to the formation of the dispersion in the process of the present invention, it is not necessary that all such derivatives be converted to free carboxyl groups. Generally, it is desirable to have free carboxyl groups on at least 0.3 mole percent, and preferably 1 to 10 mole percent, of the total bound monomer units in the substantially hydrocarbon polymer when the dispersion is being formed. Since the incorporation of the aforementioned polar monomers into the polymer results in a deteriorating change in some of the desirable properties of completely hydrocarbon polymers, the amount of such monomers introduced into the polymer must be limited. For example, in order to preclude excessive decrease in molecular weight and chemical inertness, and excessive increase in solubility in polar solvents, the amount of such bound polar monomer is limited to a maximum of 20 mole percent in the substantially hydrocarbon polymer. While the substantially hydrocarbon polymers useful in the present invention must contain the carboxylic acid group or any of the aforesaid derivatives thereof attached either directly through a single carbon-carbon linkage or through a series of carbon-carbon linkages, they may contain other polar groups in addition thereto and attached in any manner. Thus, ethylene may be copolymerized with an acid group-containing monomer and an alkenyl ester of a fatty acid, for example, vinyl formate, vinyl acetate, vinyl propionate, vinyl butyrate and the like. Since these monomers alter the physical properties of the polymeric product in a manner similar to that exhibited by the acid group-containing monomers, it is preferable when using a mixture of the two types of monomers to limit the total concentration thereof to 20 mole percent. Particularly preferred ethylene copolymers useful in the present invention include ethylene/methacrylic acid copolymers and ethylene/vinyl acetate/methacrylic acid copolymers. While it is convenient to prepare the substantially hydrocarbon polymers which are useful herein by direct copolymerization of ethylene and one or more of the aforesaid polar monomers, a step-wise preparation likewise may be utilized. For example, a completely hydrocarbon polymer may be subjected to a grafting process to effect the introduction of the requisite carboxylic acid group. This method of preparation is particularly useful for preparing substantially hydrocarbon polymers derived from alpha-olefins having the formula $RCH=CH_2$ wherein R is an alkyl group containing 1 to 16 carbon atoms since this type of monomer is not readily copolymerized with polar group-containing monomers to high molecular weight solid polymers via either free radical or the more recently discovered coordination polymerization catalysis. A substantially hydrocarbon polymer, therefore, as the term is used herein includes the aforesaid post-polymerization-treated polymers and may be defined as a polymer which is comprised of at least 80 mole percent of a completely hydrocarbon repeat unit. The initial step in the preparation of aqueous dispersions from any of the aforesaid substantially hydrocarbon polymers is the dissolution of the polymer, usually at elevated temperatures, in a substantially water-immiscible solvent. By substantially water-immiscible solvent is meant one having a solubility in water of less than about one weight percent at processing temperatures. Hydrocarbon solvents or halogenated hydrocarbon solvents usually are employed since they are most effective in dissolving the substantially hydrocarbon polymers. Since the polymer solvent normally is flashed off after formation of the dispersion, it is preferable to use a solvent which does not require rigorous conditions for distillative removal. Generally, solvents are employed which have boiling points of less than about 150° C. at 760 millimeters pressure. Exemplitive of the solvents which are particularly useful herein are benzene, toluene, the xylenes, cyclohexane, tetrachloroethylene, methylene chloride and the fluorinated and chlorofluorinated alkanes such as the "Freons." The concentration of polymer in solution may vary with the type of polymer employed and the dissolving power of the solvent. The maximum concentrations are limited by the processing difficulties encountered due to excessively high viscosities of the resultant polymer solutions. The minimum concentration of polymer in solution usually is determined by such factors as the solids content desired in the aqueous dispersion and the necessity for avoiding the handling of large volumes of solvent. After dissolution of the polymer in a substantially water-immiscible solvent the solution is treated with a member selected from the group consisting of ammonia and organic amines having a dissociation constant of at least $1 \times 10^{-8}$. While the quantity of the base introduced is not unduly critical in that addition of only small quantities thereof is reflected in the resultant characteristics of the aqueous dispersion produced, namely, high solids content and extremely small particle size, to realize the optimum effect of the ammonia or amine it should be added in a quantity at least stoichiometric with the carboxylic acid groups in the substantially hydrocarbon polymer. A wide variety of organic amines having a dissociation constant of at least $1 \times 10^{-8}$ may be employed herein including monoamines and polyamines. Further, they may be of the primary, secondary or tertiary variety. Examples of such amines include alkyl amines, alkylene diamines, alkanol amines, for example, mono-, di- or triethanol amine, and the like. Particularly preferred bases operable herein include ammonia and isopropyl amine. A still further limitation on the aforesaid base employed is that it should be capable of being maintained in contact with the substantially hydrocarbon polymer at the time of dispersion formation. Hence, if it is desirable to utilize bases which normally are volatile at process temperatures, the process preferably is conducted at superatmospheric pressure. Stated in another way, at least the minimum permissible quantity of carboxylic acid groups, as previously specified, must be in an ionized form at the time of dispersion formation. Although the base, in the process as just related, is added to the polymer solution, it, also, may be introduced into the aqueous phase prior to the admixing of the latter with the polymer solution. Admixed with the substantially water-immiscible polymer solvent described above, either before or after the polymer is dissolved therein, is a polar liquid which is miscible, at processing conditions, with the solution of polymer in substantially water-immiscible solvent, and in addition though not essential, may be miscible with water. As examples of polar liquids which may be used herein are alcohols, ketones, amides, esters, ethers and the like, including methyl ethyl ketone, cyclohexanone, dimethyl formamide, ethyl acetate, and n-butyl ether. Preferred are alkyl alcohols having 1 to 6 carbon atoms, with a preferred alcohol being isopropyl alcohol. The presence of, as well as a requisite amount of, the polar liquid used herein during admixing of the polymer solution and water is a critical feature of the present invention. The polar liquid should comprise 5 to 60 weight percent of the combined weights of polar liquid and substantially water-immiscible polymer solvent. The particular concentration of polar liquid within this range will depend upon the particular combination of polar liquid and polymer solvent chosen. For example, when a combination of benzene and isopropyl alcohol is employed, the polar liquid preferably should comprise 20 to 35 weight percent of the mixture. Preferably, the polar liquid is admixed with the polymer solvent, either before or after the polymer is dissolved therein, so as to reduce the viscosity of the polymer solution. This viscosity reduction permits more efficient admixing of the polymer solution and water during the subsequent formation of the polymer dispersion with the result that a finer polymer particle is formed. Generally, the concentration of polymer dissolved in the mixture of polymer solvent and polar liquid will vary from about 15 to 40 weight percent. While the quantity of polymer solvent employed must be correlated with the quantity of polar liquid as indicated above, the quantity of the mixture of polymer solvent and polar liquid, also, must be adjusted in relation to the amount of water which is utilized during the water-organic phase admixing step of the process. Generally, the weight ratio of the mixture of polymer solvent and polar liquid to water should be from about 1:1 to 3:1, and preferably in the range of 1.5:1 to 2.5:1. For polymers which are limitedly soluble in the polymer solvents set forth hereinabove, resort to ratios of near 3:1 and higher sometimes may be necessary, particularly if a high solids content aqueous dispersion is desired. While weight ratios even higher than about 3:1 thus may be employed, care must be exercised to preclude inversion from an oil in water system to a water in oil system. Still another critical feature of the present invention is the temperature of both the polymer solution and the water at the time the two liquid phases are admixed with effective agitation. Depending upon the solubility of the polymer in the substantially water-immiscible solvent employed, the polymer solution at the time of admixing with water generally is within the temperature range of about 55–80° C. at 760 millimeters pressure. Furthermore, the water at the time of this admixing generally is within the temperature range of about 45–80° C. at 760 millimeters pressure. Correspondingly higher or lower temperatures may be employed if the admixing is conducted at superatmospheric or subatmospheric pressures, respectively, such as when it may be desirable to alter the normal boiling points of the liquids employed or when it may be advantageous to preheat the polymer solution initially to some elevated temperature, for example, either to facilitate the dissolution of the polymer or to effect removal of substituents to form a free carboxylic acid group on the substantially hydrocarbon polymer during the treatment with ammonia or an organic amine as described hereinabove. For example, the temperature of the polymer solution and the water may be 55–100° C. and 45–100° C., respectively, when the process is operated at about 3 atmospheres pressure. The agitation utilized during admixing of the aqueous phase and the polymer solution must be effective in order to achieve fine particle size in the resultant polymer dispersion. Agitation of the type generally employed in emulsion or dispersion formation usually is adequate. Agitating devices which are of a design which induces streamline flow rather than turbulent flow should be avoided. In the present invention it has been found that a high speed stirrer equipped with a perforated disc-type paddle rotating at about 14,000 r.p.m. provides suitable agitation for the formation of fine polymer particles in the resultant dispersion. If desired, suitable baffles may be positioned in the mixing vessel to achieve more effective agitation. The duration of the agitation is not unduly critical as long as the agitation is effective. While it is not fully understood, it appears that in the process of the present invention, upon admixing of the polymer solution and the aqueous phase, there is formed initially an oil in water emulsion. Hence, in order to yield an emulsion rather than a coagulum, the minimum temperature of the mixture during this initial admixing of the polymer solution and the aqueous phase must be in excess of the polymer precipitation temperature. Generally, in a batch type process agitation is continued from about 5 minutes to about 20 minutes. Agitation beyond this time usually is unnecessary since no further change in the nature of the ultimate dispersed product is observed. The process of the present invention is equally amenable to both batch and continuous types of operation. Moreover, if desired a plurality of agitating-dispersing devices may be arranged in series. The formation of aqueous polymer dispersions having small polymer particles in the process of the present invention is facilitated by the use of surface active or dispersing agents. Anionic surfactants are preferred herein. The surfactant may be introduced into either the organic or the aqueous phase prior to the admixing thereof, or if desired, the surfactant may be formed in situ during the admixing step, for example, by dissolving the organic moiety such as a fatty acid in the organic phase and a cation donor such as an alkali metal hydroxide in the aqueous phase. In situ formation of the surface active agent is particularly preferred when it is desirable to employ the carboxylic acid group of the substantially hydrocarbon polymer as a site of attachment of ionic crosslinks formed by interaction of the acid group with metal cation-containing basic compounds. For example, in forming an anionic dispersing agent by interaction of a fatty acid and an alkali metal hydroxide, use of an excess of the hydroxide over that necessary to react with the fatty acid will provide the metal cation requisite for the formation of ionic crosslinks. The process may be operated in such a way so as to deliberately promote the formation of metallo-ionic crosslinks, regardless of whether the dispersing agent is formed in situ or not. Whenever metal hydroxides are employed, it is preferable to add sufficient metal hydroxide to neutralize at least 10 percent of the carboxylic acid groups of the substantially hydrocarbon polymer. If desired, sufficient metal hydroxide may be added to neutralize all the available carboxylic acid groups of the polymer, although the amount neutralized in excess of the aforesaid 10 percent is determined by the ultimate characteristics sought in the polymer particles of the product dispersion. It has been noted in the process of the present invention that when a metal hydroxide is employed as described above, the amount of ammonia or organic amine utilized in the present invention may be diminished to less than the stoichiometric quantities previously stipulated. In general, in the range of quantities of metallic bases sufficient to neutralize from about 10 to about 50–75 percent of the carboxylic acid groups, the combination of such metallic base and an organic amine or ammonia should be stoichiometric with the carboxylic acid groups of the polymer. As more than about 50–75 percent of the carboxylic acid groups are neutralized with a metallic base, it is preferable, though not always essential, to maintain the quantity of the ammonia or organic base at no less than about 25–50 percent of the stoichiometric quantity which would be required to neutralize all the carboxylic acid groups in the absence of the metallic base. Further details as to ionically crosslinked polymers which are useful in the instant dispersions may be found in copending applications Serial Numbers 168,839 and 271,477. While anionic dispersing agents usually are utilized herein to facilitate formation of the aqueous dispersion, other agents such as a nonionic dispersing agent may be introduced at any stage of the process to act as a stabilizer for the aqueous dispersion after its formation. The final step in the formation of the aqueous polymer dispersions of the present invention involves the removal of the polymer solvent and the polar liquid. This may be effected by a variety of techniques familiar to those skilled in the art of dispersion formation. For example, the organic liquids may be distillatively stripped at subatmospheric pressure from the multiphase mixture immediately following the effective admixing of the aqueous and organic phases. Alternatively, a stream of gas may be passed over or through the mixture to volatilize the organic liquids. An attractive feature of the present invention is that regardless of which method of removal is employed, there is a markedly reduced tendency toward foaming as compared to many of the dispersion-forming processes described in the art. By means of the present invention, as described hereinabove, it is possible to formulate high solids content aqueous polymer dispersions having an average particle size of less than 0.5 micron, and frequently less than 0.1 micron. The following examples are given to demonstrate but not limit the present invention.

*Example I.*—16 grams of an ethylene/vinyl acetate/methacrylic acid copolymer having a melt index of about 170 (as measured by A.S.T.M. test method D–1238–57T) and containing 10 weight percent bound methacrylic acid and 22 weight percent bound vinyl acetate are dissolved in 184 grams of a 3:1, by weight, mixture of benzene and isopropyl alcohol by heating to 65 C. The concentration of polymer in solution is 8.0 weight percent. The temperature of the solution is adjusted to 55° C. After saturating the solution with ammonia 0.8 gram of oleic acid is introduced. The solution then is added to a 55° C. alkaline solution of 0.11 gram of sodium hydroxide in 100 cc. of water. Intimate mixing of the aqueous and polymer solutions is effected during this addition by means of a high speed stirrer having a perforated disc attached to the end thereof and rotating at a speed of 14,000 r.p.m. Appropriately positioned baffles in the mixing vessel facilitate the intimate contacting of the two phases. Agitation is continued for about 5 minutes. The polymer dispersion having a Brookfield viscosity of 40 cp. is transferred to a jacketed vessel equipped with a mechanical agitator and a means of distillatively removing volatile liquids under reduced pressure. The organic components are removed at 82° C. and about 375 mm. pressure. The resultant aqueous polymer dispersion contains 26 weight percent solids and has a Brookfield viscosity of 4 cp. The polymer particles have an average size of less than 0.5 micron.

*Example II.*—Example I is repeated except that the polymer is dissolved in benzene and the ammonia treatment of the polymer solution is omitted. The polymer dispersion prior to stripping off of the liquid organic phase has a Brookfield viscosity of 130 cp. The aqueous dispersion product contains 15 weight percent solids and has a Brookfield viscosity of 9 cp. The polymer particles have an average size of 1 to 1.5 microns.

*Example III.*—Example I is repeated using in place of the benzene-isopropyl alcohol mixture a 3:1, by weight, mixture of benzene and methyl alcohol. The polymer dispersion prior to the stripping operation has a Brookfield viscosity of 8 cp. The resultant aqueous polymer dispersion after removal of the organic components contains 17 weight percent solids and has a Brookfield viscosity of 2 cp. The polymer particles have an average size of less than 0.5 micron.

*Example IV.*—Example III is repeated using a benzene-ethyl alcohol mixture in place of the benzene-methyl alcohol mixture for dissolution of the polymer. The polymer dispersion prior to removal of the organic liquids has a Brookfield viscosity of 6 cp. The product aqueous polymer dispersion contains 15 weight percent solids and has a Brookfield viscosity of 2 cp. The polymer particles have an average size of less than 0.5 micron.

*Example V.*—Example IV is repeated using n-hexyl alcohol in place of ethyl alcohol. The polymer dispersion prior to removal of the organic liquids has a Brookfield viscosity of 20 cp. The product aqueous polymer dispersion contains 13 weight percent solids and has a Brookfield viscosity of 2.5 cp. The polymer particles have an average size of less than 0.5 micron.

*Example VI.*—Example V is repeated using dimethyl formamide in place of n-hexyl alcohol. The polymer dispersion prior to removal of the organic liquids has a Brookfield viscosity of 30 cp. The product aqeuous polymer dispersion contains 14 weight percent solids and has a Brookfield viscosity of 2 cp. The polymer particles have an average size of less than 0.5 micron.

*Example VII.*—16 grams of an ethylene/methacrylic acid copolymer having a melt index of about 100 (as measured by A.S.T.M. test method D–1238–57T) and containing 9 weight percent bound methacrylic acid are dissolved in 184 grams of a 3:1, by weight, mixture of toluene and isopropyl alcohol by heating to 75° C. The concentration of polymer in solution is 8 weight percent. The temperature of the solution is adjusted to 70° C. After saturating the solution with ammonia 0.8 gram of oleic acid is introduced. The solution then is added to a 70° C. alkaline solution of 0.11 gram of sodium hydroxide in 100 cc. of water. Intimate mixing of the aqueous and polymer solutions is effected during this addition by means of a high speed stirrer having a perforated disc attached to the end thereof and rotating at a speed of 14,000 r.p.m. Appropriately positioned baffles in the mixing vessel facilitate the intimate contacting of the two phases. Agitation is continued for about 5 minutes. The polymer dispersion having a Brookfield viscosity of 13 cp. is transfererd to a jacketed vessel equipped with a mechanical agitator and a means for distillatively removing volatile liquids under reduced pressure. The organic components are removed at about 80° C. and about 375 millimeters pressure. The resultant aqueous polymer dispersion contains 24 weight percent solids and has a Brookfield viscosity of 4 cp. The polymer particles have an average size of less than 0.5 micron.

*Example VIII.*—Example VII is repeated using n-butyl alcohol in place of the isopropyl alcohol. The polymer dispersion prior to removal of the organic liquids has a Brookfield viscosity of 11 cp. The product aqueous polymer dispersion contains 31 weight percent solids and has a Brookfield viscosity of 6 cp. The polymer particles have an average size of less than 0.5 micron.

*Example IX.*—7 grams of an ethylene/methacrylic acid copolymer containing 10 weight percent bound methacrylic acid are dissolved in 190 grams of a 3:1, by weight, mixture of carbon tetrachloride and isopropyl alcohol by heating to 70° C. To the solution are added 0.65 gram of isopropyl amine and 0.5 gram of oleic acid. The solution is then added to a 70° C. alkaline solution of 0.07 gram of the sodium hydroxide in 100 cc. of water. Intimate mixing of the aqueous and polymer solutions is effected during this addition by means of a high speed stirrer having a perforated disc attached to the end thereof and rotating at a speed of 14,000 r.p.m. Appropriately positioned baffles in the mixing vessel facilitate the intimate contacting of the two phases. Agitation is continued for about 5 minutes. The polymer dispersion is transferred to a jacketed vessel equipped with a mechanical agitator and a means for distillatively removing volatile liquids under reduced pressure. The solvent and polar liquid are removed at about 60° C. and about 550 millimeters pressure to yield an aqueous polymer dispersion containing 7 weight percent solids. The polymer particles have an average size of less than 0.5 micron.

*Example X.*—20 grams of an ethylene/vinyl acetate/methacrylic acid copolymer containing 26 weight percent bound vinyl acetate and 9 weight percent bound methacrylic acid are dissolved in 180 grams of a 3:1, by weight, mixture of carbon tetrachloride and isopropyl alcohol by heating to about 70° C. To the solution are added 1.3 gram of isopropyl amine and 1.0 gram of oleic acid. The solution is then added to a 65° C. alkaline solution of 0.14 gram of sodium hydroxide in 100 cc. of water. Intimate mixing of the aqueous and polymer solutions is effected during this addition by means of a high speed stirrer having a perforated disc attached to the end thereof and rotating at a speed of 14,000 r.p.m. Appropriately positioned baffles in the mixing vessel facilitate the intimate contacting of the two phases. Agitation is continued for about 5 minutes. The polymer dispersion is transferred to a jacketed vessel equipped with a mechanical agitator and a means for distillatively removing volatile liquids under reduced pressure. The solvent and polar liquid are removed at 50–60 °C. and 375–550 millimeters pressure to yield an aqueous polymer dispersion containing 18 weight percent solids. The polymer particles have an average size of less than 0.5 micron.

*Example XI.*—Example X is repeated using hexamethylene diamine in place of isopropyl amine. A comparable aqueous dispersion is obtained.

*Example XII.*—20 grams of an ethylene/vinyl acetate/methacrylic acid copolymer containing 26 weight percent bound vinyl acetate units and 9 weight percent bound methacrylic acid units are dissolved in 180 grams of toluene by heating to 80–90° C. To the solution are added 2 grams of morpholine. The solution, after heating to 95° C., is added to 100 grams of a 95° C. aqueous solution containing 0.5 gram of 2,4'-disodiumsulfonato-4-dodecyldiphenyl ether. Agitation is effected as in the previous examples. After the distillative removal of the toluene there is recovered an aqueous polymer dispersion having a 26 percent solids content. The polymer particles have an average size of 1 to 1.5 microns.

*Example XIII.*—Example XII is repeated except that the polymer solvent is a 3:1, by weight, mixture of toluene and isopropyl alcohol instead of toluene. The resultant aqueous polymer dispersion has an average solids particle size of less than 0.5 micron.

*Example XIV.*—Example V is repeated using methyl ethyl ketone in place of n-hexyl alcohol. The polymer dispersion prior to removal of the organic liquids has a Brookfield viscosity of 19 cp. The product aqueous polymer dispersion contains 17 weight percent solids and has a Brookfield viscosity of 1.5 cp. The polymer particles have an average size of less than 1.0 micron.

*Example XV.*—Example V is repeated using ethyl acetate in place of n-hexyl alcohol. The polymer dispersion prior to removal of the organic liquids has a Brookfield viscosity of 16 cp. The product aqueous polymer dispersion contains 18 weight percent solids and has a Brookfield viscosity of 2.5 cp. The polymer particles have an average size of less than 2.5 microns.

*Example XVI.*—Example VIII is repeated using n-butyl ether in place of n-butyl alcohol. The polymer dispersion prior to removal of the organic liquids has a Brookfield viscosity of 35 cp. The product aqueous dispersion contains 17 weight percent solids and has a Brookfield viscosity of 9 cp. The polymer particles have an average size of less than 2.5 microns.

*Example XVII.*—Example I is repeated except that the 3:1, by weight, mixture of benzene and isopropyl alcohol is replaced with a 4:1, by weight, mixture of these two liquids. The polymer dispersion prior to removal of the organic liquids has a Brookfield viscosity of 35 cp. The product aqueous dispersion contains 26 weight percent solids and has an average particle size of less than 1 micron.

*Example XVIII.*—Example XVII is repeated using a 65:35, by weight, mixture of benzene and isopropyl alcohol in place of the 4:1, by weight, mixture of these two liquids. The polymer dispersion prior to removal of the organic liquids has a Brookfield viscosity of 28 cp. The product aqueous dispersion contains 24 weight percent solids and has an average particle size of less than 1 micron.

*Example XIX.*—A polymer solution is made up so as to comprise, on a weight basis, 10.1 percent of an ethylene/methacrylic acid copolymer containing 10 weight percent bound methacrylic acid, 68.6 percent benzene, 20.6 percent isopropyl alcohol, 0.50 percent oleic acid and 0.20 percent ammonia. The polymer solution, heated to 90° C., is fed continuously at a rate of 24 lbs./hr. to a dispersing device providing effective agitation. At the same time an aqueous solution containing, on a weight basis, 4.7 percent isopropyl alcohol and 0.29 percent sodium hydroxide is fed continuously to the disperser at a rate of 12.5 lbs./hr. The temperature and pressure in the dispersing device are maintained at 95° C. and 46 p.s.i.g., respectively. The product dispersion is fed continuously into a steam-heated rising film evaporator whose temperature varies from about 68° C. at the inlet end to about 83° C. at the outlet end. The vapor and liquid dispersion are separated in a cyclone separator, the vapor being condensed and recycled. The aqueous polymer dispersion as recovered from the separator contains, on a weight basis, 19 percent solids, 1 percent benzene and 4 percent isopropyl alcohol. Alternately, the aqueous dispersion recovered from the cyclone separator is fed into a second, steam-heated, rising film evaporator to remove additional liquid. The product aqueous polymer dispersion now recovered contains 25 percent solids and less than 0.2 percent benzene and less than 0.2 percent isopropyl alcohol.

*Example XX.*—8.3 grams of an ethylene/methacrylic acid copolymer having a melt index of about 45 (as measured by A.S.T.M. test method D–1238–57T) and containing 10 weight percent bound methacrylic acid are dissolved in 115 grams of a 65:35, by weight, mixture of cyclohexane and isopropyl alcohol by heating to 65° C. The concentration of polymer in solution is 7.2 weight percent. Thereupon, 0.4 gram of oleic acid and 0.6 gram of isopropyl amine are introduced. The solution then is added to 65° C. alkaline solution of 0.21 gram of sodium hydroxide in 75 cc. of water. Intimate mixing of the aqueous and polymer solutions is effected in a Waring Blendor. Agitation is continued for about 3 minutes. The polymer dispersion is transferred to a vessel equipped with a mechanical agitator and a means of distillatively removing volatile liquids. The volatile organic components are removed and the resultant aqueous polymer dispersion contains 13 weight percent solids. The polymer particles have an average size of less than 0.5 micron.

It has been found as still another feature of the present invention that high solids content, fine particles size, aqueous polymer dispersions may be prepared from completely hydrocarbon polymers, for example, polyethylene, by carrying out the steps of the process as hereinabove defined on a mixture comprised of a major fraction of a completely hydrocarbon polymer and a minor fraction of a substantialy hydrocarbon polymer containing pendant carboxylic acid groups of derivatives thereof capable of being converted to carboxylic acid groups. When the process is carried out on such mixtures, there are obtained aqueous polymer dispersions comprised principally of completely hydrocarbon polymers and wherein the average polymer particle size is markedly less than that achieved when the completely hydrocarbon polymer is dispersed in the absence of the minor amount of the substantially hydrocarbon polymer containing pendant carboxylic acid groups. The exact amount of the minor component required in the aforesaid mixture will, of course, vary with the substantially hydrocarbon and completely hydrocarbon polymers employed. Regardless of whether the dispersions of the present invention are made solely with substantially hydrocarbon polymers or with mixtures thereof with completely hydrocarbon polymers, they are useful in many of the applications normally served by hydrocarbon polymer dispersions, such as in coating and adhesive applications and the like.

In all the foresaid examples viscosity measurements have been made by means of a standard analytical technique while polymer particle sizes have been measured by means of microscopic examination. Light scattering or light transmittance methods likewise have been employed for determination of particle size.

We claim:
1. A process for preparing aqueous polymer dispersions which comprises the steps of intimately contacting with water a solution of a substantially hydrocarbon polymer in a substantially water-immiscible solvent, said substantially hydrocarbon polymer having carboxyl groups attached thereto by a carbon-carbon linkage, and said polymer comprising 80–99.7 mole percent bound α-olefin units having 2–18 carbon atoms and 0.3–20 mole percent bound carboxyl units, said substantially water-immiscible solvent being selected from the group consisting of hydrocarbons and halogenated hydrocarbons having a boiling point at 760 millimeters pressure of less than 150° C., in the presence of a base selected from the group consisting of ammonia and an organic amine having a dissociation constant of at least $1 \times 10^{-8}$, a polar liquid, and a dispersing agent, said polar liquid being selected from the group consisting of alcohols, ketones, and amides, said polar liquid comprising at least about 5 weight percent of the combined weights of polar liquid and substantially water-immiscible solvent, and thereafter removing said substantially water-immiscible solvent and said polar liquid and recovering an aqueous polymer dispersion having an average solids particle size of less than about 1.0 microns.

2. The process of claim 1 wherein the substantially hydrocarbon polymer comprises 80–99.7 mole percent bound ethylene units and 0.3–20 mole percent bound methacrylic acid units.

3. The process of claim 1 wherein the substantially hydrocarbon polymer comprises 80–99.7 mole percent bound ethylene units and 0.3–20 mole percent bound vinyl acetate and methacrylic acid units.

4. A process of claim 1 wherein said dispersing agent is an anionic dispersing agent, and wherein the weight ratio of the mixture of substantially water-immiscible solvent and polar liquid to water is 1:1 to 3:1.

5. A process of claim 4 wherein the polar liquid comprises 5 to 60 weight percent of the combined weights of polar liquid and substantially water-immiscible solvent.

6. A process of claim 4 wherein the water is at a temperature of 45–80° C. at atmospheric pressure, and said solution of a substantially hydrocarbon polymer in a substantially water-immiscible solvent is at a temperature of 55–80° C. at atmospheric pressure, wherein said base is isopropyl amine which is present in an amount at least stochiometric with the carboxyl groups of the substantially hydrocarbon polymer wherein said polar liquid is, an alkyl alcohol containing 1 to 6 carbon atoms, said alcohol comprising 20 to 35 weight percent of the combined weights of alcohol and substantially water-immiscible polymer solvent, and wherein the dispersion has an average solids particle size of less than 0.5 micron.

7. The process of claim 6 wherein the alkyl alcohol containing 1 to 6 carbon atoms is isopropyl alcohol.

8. A process of claim 4 wherein the water is at a temperature of 45–80° C. at atmospheric pressure, and said solution is at a temperature of 55–80° C. at atmospheric pressure, wherein said base is ammonia which is present in an amount at least stoichiometric with the carboxyl groups of the substantially hydrocarbon polymer wherein said polymer liquid is an alkyl alcohol containing 1 to 6 carbon atoms, said alcohol comprising 20 to 35 weight percent of the combined weights of alcohol and substantially water-immiscible polymer solvent, and wherein the dispersion has an average solids particle size of less than 0.5 micron.

9. The process of claim 8 wherein the alkyl alcohol containing 1 to 6 carbon atoms is isopropyl alcohol.

10. A process of claim 1 conducted in the presence of an alkali metal hydroxide the combined quantities of alkali metal hydroxide and said base being at least stoichiometric with the carboxyl groups of the substantially hydrocarbon polymer.

11. The process of claim 1 wherein the quantity of alkali metal hydroxide is sufficient to neutralize at least 10 percent of the carboxyl groups of the substantially hydrocarbon polymer.

References Cited by the Examiner

UNITED STATES PATENTS

| | | | |
|---|---|---|---|
| 2,200,429 | 5/1940 | Perrin et al. | 260—85.3 |
| 2,313,144 | 3/1943 | Gomm | 260—29.6 |
| 2,388,225 | 10/1945 | Brooks et al. | 260—88.1 |
| 2,496,989 | 2/1950 | Cupery | 260—29.6 |
| 2,561,951 | 7/1951 | Roberts | 260—88.1 |

FOREIGN PATENTS 497,643   12/1938   Great Britain.

MURRAY TILLMAN, *Primary Examiner.*
W. J. BRIGGS, *Assistant Examiner.*